(12) United States Patent
Hayashi

(10) Patent No.: US 6,741,596 B1
(45) Date of Patent: May 25, 2004

(54) PIPELINE TYPE PROCESSOR FOR ASYNCHRONOUS TRANSFER MODE (ATM) CELLS

(75) Inventor: Takeo Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/453,968

(22) Filed: Dec. 3, 1999

(30) Foreign Application Priority Data

Dec. 3, 1998 (JP) ........................................... 10-344354

(51) Int. Cl.$^7$ ............................................... H04L 12/00
(52) U.S. Cl. ..................... 370/395.1; 370/412; 370/419
(58) Field of Search ............................. 712/28, 29, 30, 712/32, 205, 206, 207, 225, 226; 700/2, 4, 5, 19; 370/395, 412

(56) References Cited

U.S. PATENT DOCUMENTS

| | | | | |
|---|---|---|---|---|
| 4,524,455 A | * | 6/1985 | Holsztynski et al. | 382/303 |
| 4,589,067 A | * | 5/1986 | Porter et al. | 712/9 |
| 4,594,659 A | * | 6/1986 | Guenthner et al. | 712/207 |
| 4,984,151 A | * | 1/1991 | Dujari | 712/241 |
| 5,598,410 A | * | 1/1997 | Stone | 370/469 |
| 5,850,395 A | * | 12/1998 | Hauser et al. | 370/398 |
| 6,157,955 A | * | 12/2000 | Narad et al. | 709/228 |

FOREIGN PATENT DOCUMENTS

| | | | | | |
|---|---|---|---|---|---|
| JP | 3171229 A | * | 7/1991 | | |
| JP | 3263130 A | * | 11/1991 | | |
| JP | 4120652 A | * | 4/1992 | | |
| JP | 08083168 A | * | 3/1996 | ............. | G06F/9/06 |
| JP | 1-295335 | | 11/1998 | | |

* cited by examiner

Primary Examiner—Huy D. Vu
Assistant Examiner—Daniel Ryman
(74) Attorney, Agent, or Firm—Foley & Lardner

(57) ABSTRACT

A pipeline type processor, which is capable of determining a process starting address for each processor constituting the pipeline type processor prior to executing the process for increasing the processing capability of each processor even if the processing condition for each processor vary depending upon the type of ATM cell to be processed, is realized. Prior to cell process by a cell processing section, in which a plurality of processors are provided, an address determining section obtains key information such as the type of cell and the contents of the cell from the input ATM cell, and retrieves a process starting address for each processor by referring to a predetermined address storing table with the key information. The retrieved process starting address for each processor is transferred to the cell processing section, and each processor executes its process from the process starting address when the ATM cell has been stored into a buffer corresponding to own processor.

12 Claims, 7 Drawing Sheets

PIPELINE TYPE PROCESSOR FOR ASYNCHRONOUS TRANSFER MODE (ATM) CELLS

BACKGROUND OF THE INVENTION

1. Field of the Invention

The present invention relates to a pipeline type processor for processing asynchronous transfer mode (ATM) cells, and more particularly relates to a pipeline type processor that determines necessary processing condition for each processor constituting the pipeline type processor and provides the determined condition to each processor in advance of its individual processing in order to cope with the ATM cell processing which is different from each other depending upon cell conditions such as the type of cell and the contents of the cell.

2. Description of the Related Art

A pipeline type processor is used in a technical field in which a large volume of data such as picture image data is to be processed in a high speed. A plurality of processors are provided in the pipeline type processor, and each processor performs a partial processing dedicated to each processor. Data input into the pipeline type processor is partially processed by each of a plurality of processors one by one like a production line, and output from the pipeline type processor as completely processed data.

An example of a system in which all processors in a pipeline type processor can partially process input data in the same processing time is disclosed in Japanese published unexamined patent application No. Hei 1-295335, titled A Load Distribution System.

As shown in FIG. 8, the load distribution system disclosed in the above patent application is composed of partial processing 81 to 8n divided so that processing can be processed in the same time and processors 91 to 9n for processing data. The above load distribution system is composed so that the partial processing 81 in the processor 91 of precedently input data is finished when the processor 91 receives input data and starts the execution of the partial processing 81. The residual processors 92 to 9n and partial processing 82 to 8n are also similarly composed.

However, in the above prior art, there is a defect that if the processing of an input cell is different depending upon a condition such as the type and the contents of the cell, processing is redundant. The reason is that if a series of processing of an input cell is divided into partial processing, processing for determining a condition is required in each partial processing.

SUMMARY OF THE INVENTION

The object of the present invention is to avoid the need to determine a condition by each processor during processing, even if the processing of an input cell is different, depending upon a condition such as the type and the contents of the cell and to increase the quantity of processing that each processor can process within a fixed time during pipeline processing composed of n pieces of partial processing in which processing is finished within predetermined time, for example within one cell time.

The present invention made to solve the above problem is based upon a Pipeline type processor for asynchronous transfer mode (ATM) cells provided with input buffers for storing n pieces of asynchronous transmission mode (ATM) cells, n pairs of a processor and a buffer for processing the above each cell according to pipeline processing and an address determining section for determining a condition of pipeline processing. The above address determining section determines a processing instruction code starting address of each cell based upon the information of each cell stored in the input buffer, and the processors sequentially execute pipeline processing based upon the each processing instruction code starting address.

That is, in the present invention, in pipeline processing y n pieces of processors in which processing is finished within a predetermined time, for example within one cell time of an ATM cell, if the processing of a input cell is different depending upon a condition such as the type and the contents of the cell, a condition is determined before pipeline processing and the contents of processing composed of n pieces of steps by the processor are determined beforehand.

DETAILED DESCRIPTION OF THE PREFERRED EMBODIMENTS

Figure 1:
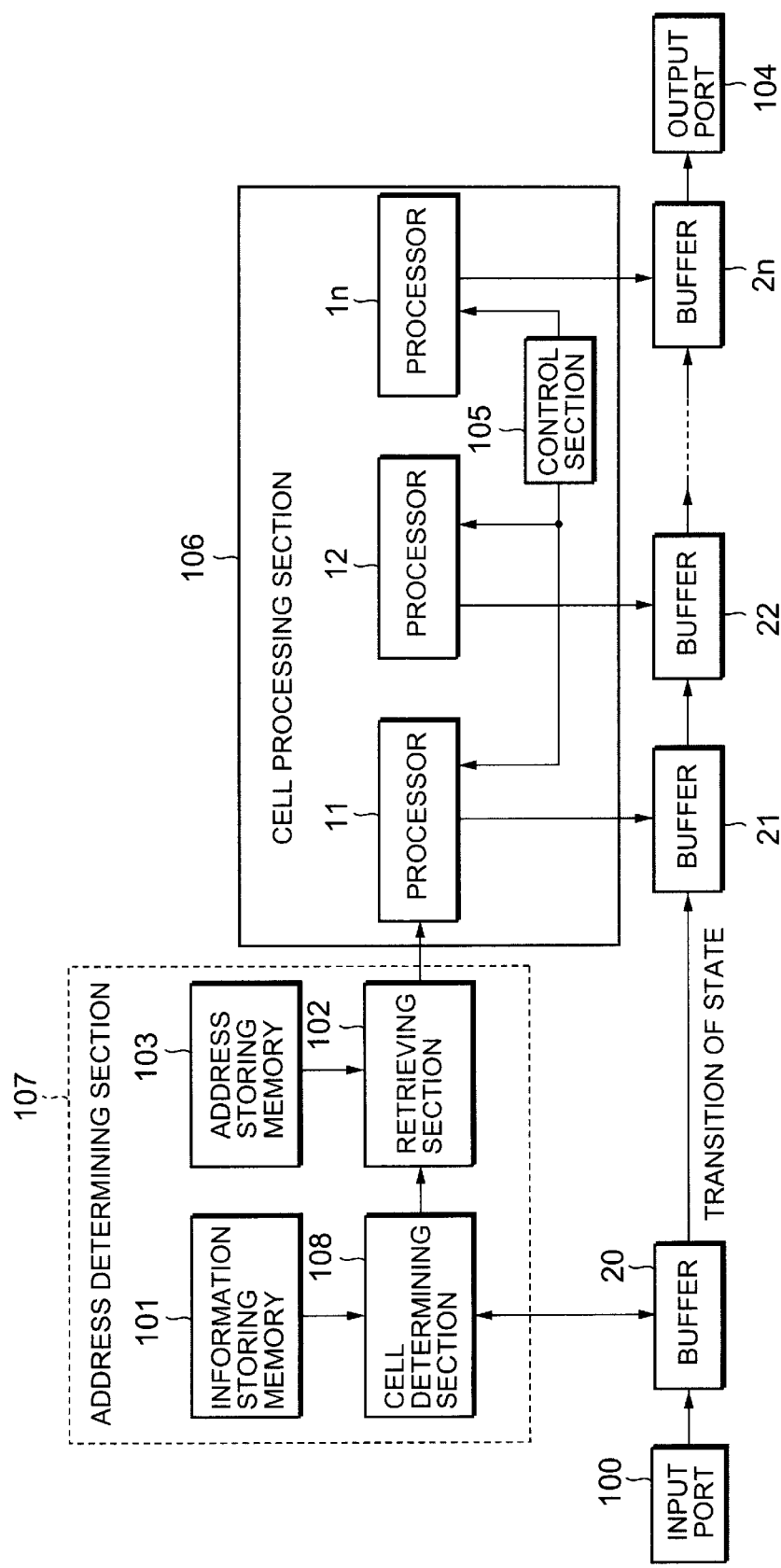
FIG. 1 is a block diagram showing a Pipeline type processor for asynchronous transfer mode (ATM) cells according to the present invention.

Referring to the drawings, an embodiment of the present invention will be described below.

As shown in FIG. 1, this embodiment includes an input port 100 for receiving a cell, a processing instruction code starting address determining section 107 for determining the address of a processing instruction code read by each processor 11 to 1n, a cell processing section 106 for processing a cell, (n+1) pieces of buffer memories 20 to 2n for storing an input cell and an output port 104 for sending a processed cell.

The processing instruction code starting address determining section 107 is provided with a cell determining section 108, an information storing memory 101, a processing instruction code starting address storing memory 103 and a retrieving section 102.

The cell determining section 108 reads its information from an input cell and determines the type of the cell, reads required information from the information storing memory 101 and generates a condition for retrieval, and informs the retrieving section 102 of the condition. The information storing memory 101 stores information related to a cell stored in a buffer memory. The processing instruction code starting address storing memory 103 stores processing instruction code leading addresses 31 to 3n which are addresses in memories storing a condition such as the type and the contents of an input cell and processing instruction codes which the processors 11 to 1n execute. The retrieving section 102 retrieves a condition stored in the processing instruction code starting address storing memory 103 using a condition informed by the cell determining section 108 as a key and retrieves a processing instruction code starting address.

The cell processing section is provided with the processors 11 to 1n and a state transition control section 105.

The processors 11 to 1n reads a processing instruction code based upon an processing instruction code starting address informed by the processing instruction code starting address determining section 107 and execute the processing of each cell stored in buffer memories 21 to 2n. The state transition control section 105 controls the state of (n+1) pieces of buffer memories 20 to 2n.

A state in which each processor 11 to 1n shown in FIG. 1 processes the buffer memories 21 to 2n is respectively called a state 1, a state 2 and a state n. A cell received by the input port 100 is stored in the buffer memory 20, the data contents of the input cell is read by the cell determining section 108, required information is read from the information storing memory 101, the type of the cell and others are discriminated and a condition for retrieval is informed the retrieving section 102. The retrieving section 102 retrieves the processing instruction code starting address storing memory 103 under the informed condition, determines the processing instruction code starting address of each processor 11 to 1n and informs the cell processing section 106 of the address. When the above processing is finished, the buffer memory 20 storing a cell proceeds to the state 1. The processor 11 reads a processing instruction code stored at the processing instruction code starting address determined by the retrieving section 102 and applies processing to the cell in the buffer memory 21 for the state 1. When the processing applied to the cell in the buffer memory for the state 1 is finished, the buffer memory 21 proceeds from the state 1 to the state 2 of the buffer memory 22, the processor 12 reads a processing instruction code stored in the processing instruction code starting address determined by the retrieving section 102 and applies processing to a cell in the buffer memory 22 for the state 2. Similar processing is sequentially applied up to the processor 1n.

When a state proceeds to the state n of the buffer memory 2n and processing by the processor in is finished, a series of processing to input cells is finished and is output from the output port 104. Hereby, processing can be executed without each processor determining a condition.

As shown in FIG. 1, a cell received by the input port 100 is written to (n+1) buffer memories 20 to 2n. The cell determining section 108 reads information from the received cell, determines the type of the cell, reads information related to the cell stores in the buffer memory 20 from the information storing memory 101, generates a condition for retrieval in combination with the above cell type and informs the retrieving section 102 of the condition.

Figure 2:
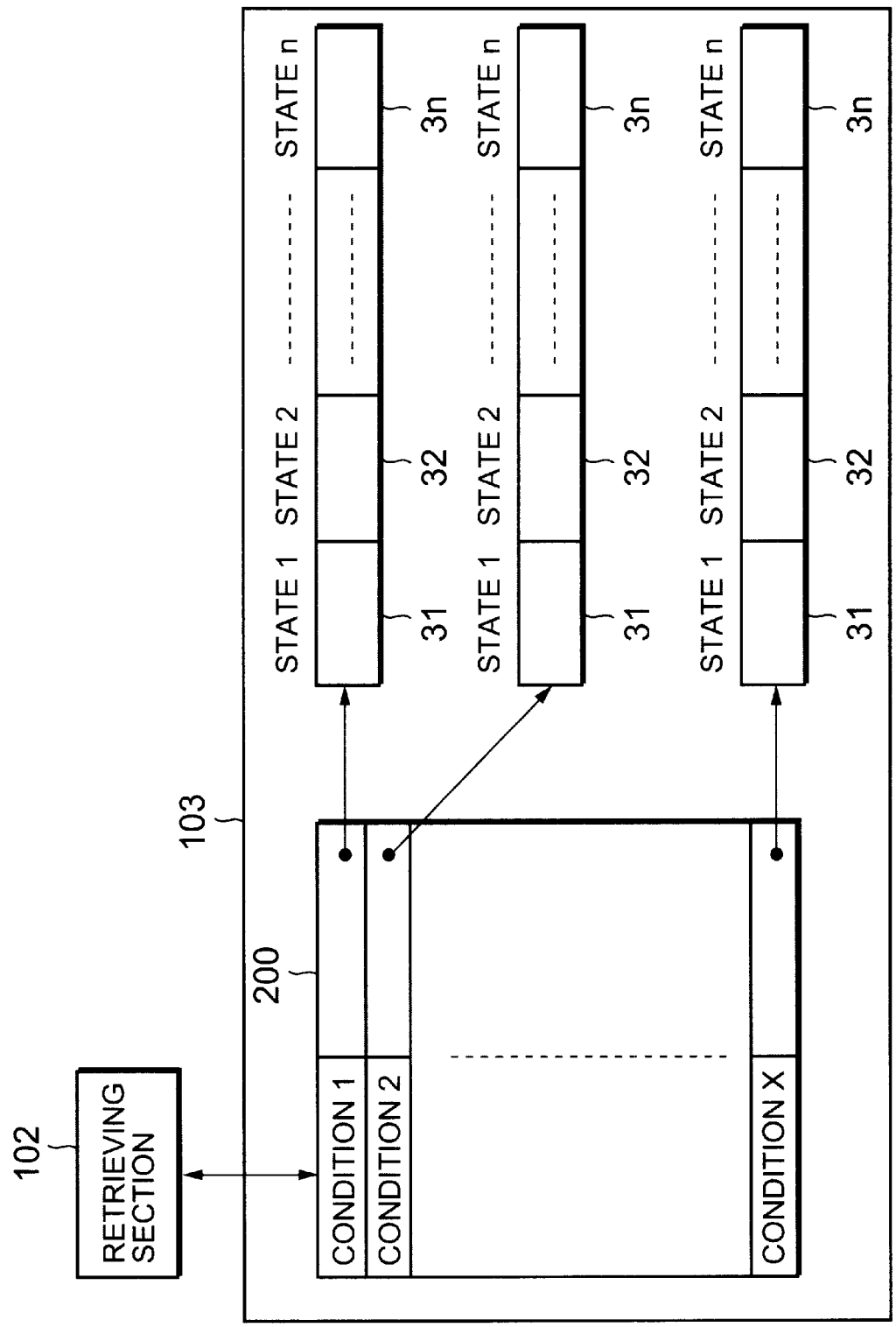
FIG. 2 is a block diagram showing a memory storing a processing instruction code starting address.

As shown in FIG. 2, the retrieving section 102 retrieves conditions 1 to X in a memory for retrieval 200 using the generated condition as a key. If a condition equivalent to a retrieval key is stored in the memory for retrieval 200, the retrieving section 102 reads the corresponding processing instruction code starting addresses 31 to 3n in the states 1 to n from the memory for retrieval 200. The above processing instruction code starting addresses 31 to 3n are stored in an address storing memory 300 shown in FIG. 3 in each processor 11 to 1n via the cell processing section 106. If a condition equivalent to a retrieval key is not stored in the memory for retrieval 200, a prepared default processing instruction code starting address is used.

The buffer memory 20 proceeds to the state 1 when the above processing is finished and when the state transition control section 105 detects the above transition of the state, the processor 11 starts processing.

Figure 3:
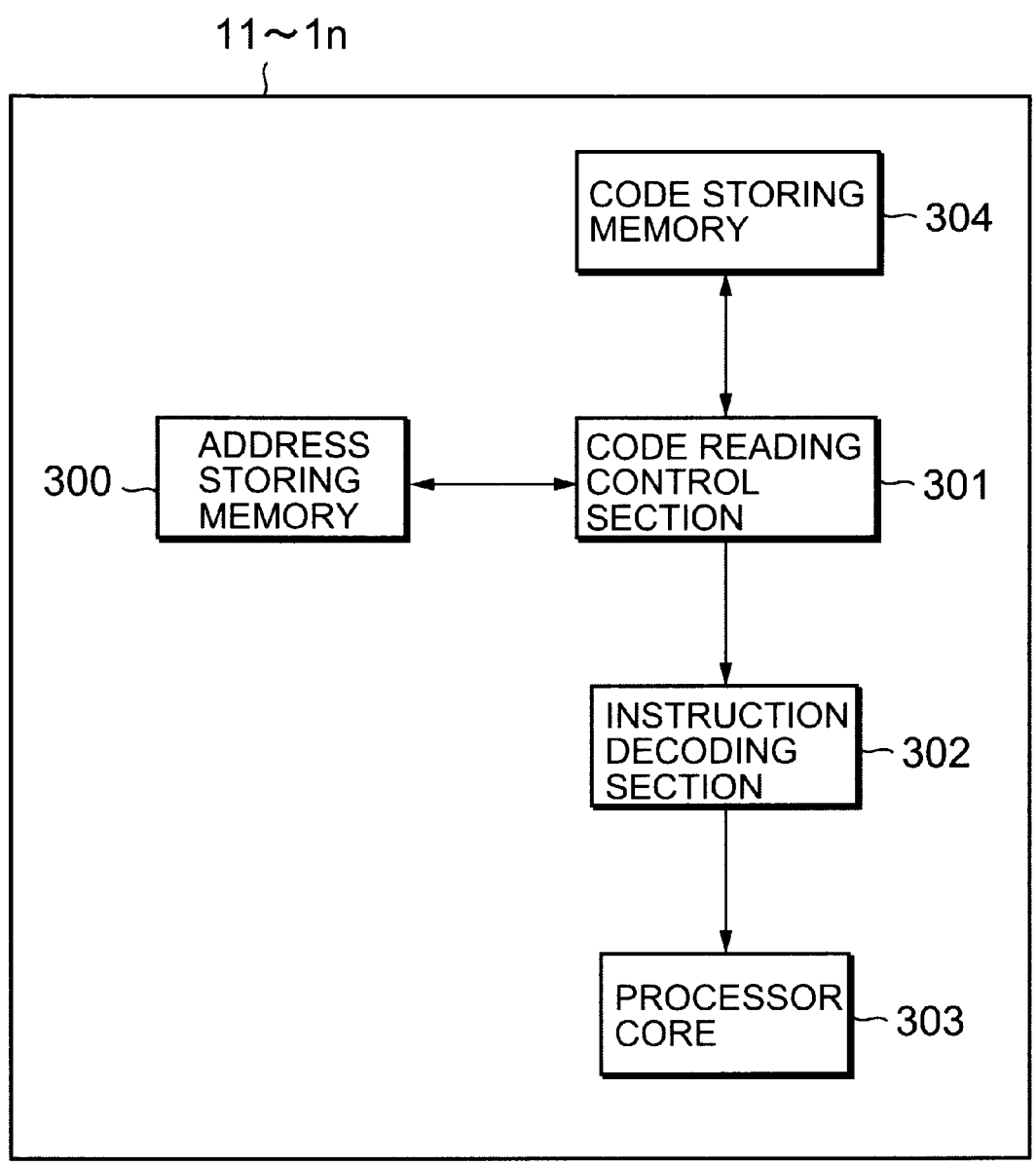
FIG. 3 is a block diagram showing processors 11, 12 and 1n.

As shown in FIG. 3, a processing instruction code reading control section 301 reads a processing instruction code starting address from a predetermined address of the address storing memory 300 and reads a processing instruction code based upon the read processing instruction code starting address from a processing instruction code storing memory 304. The read processing instruction code is decoded by an instruction decoding section 302, is passed to a processor core 303 and an instruction is executed. When processing is finished, the buffer memory 21 in the state 1 proceeds to the state of the buffer memory 22 and processing is executed by the processor 12. The state transition control section 105 informs the processing instruction code reading control section 301 of the processor 12 when the above transition of the state is detected. Hereafter, the same processing as in the state 1 is executed.

When the processing of the state n is finished, a cell stored in the buffer memory 2n is output from the output port 104 and the buffer memory 2n becomes a state waiting for an input cell.

Next, the operation of this embodiment will be described using a concrete example.

Figure 5:
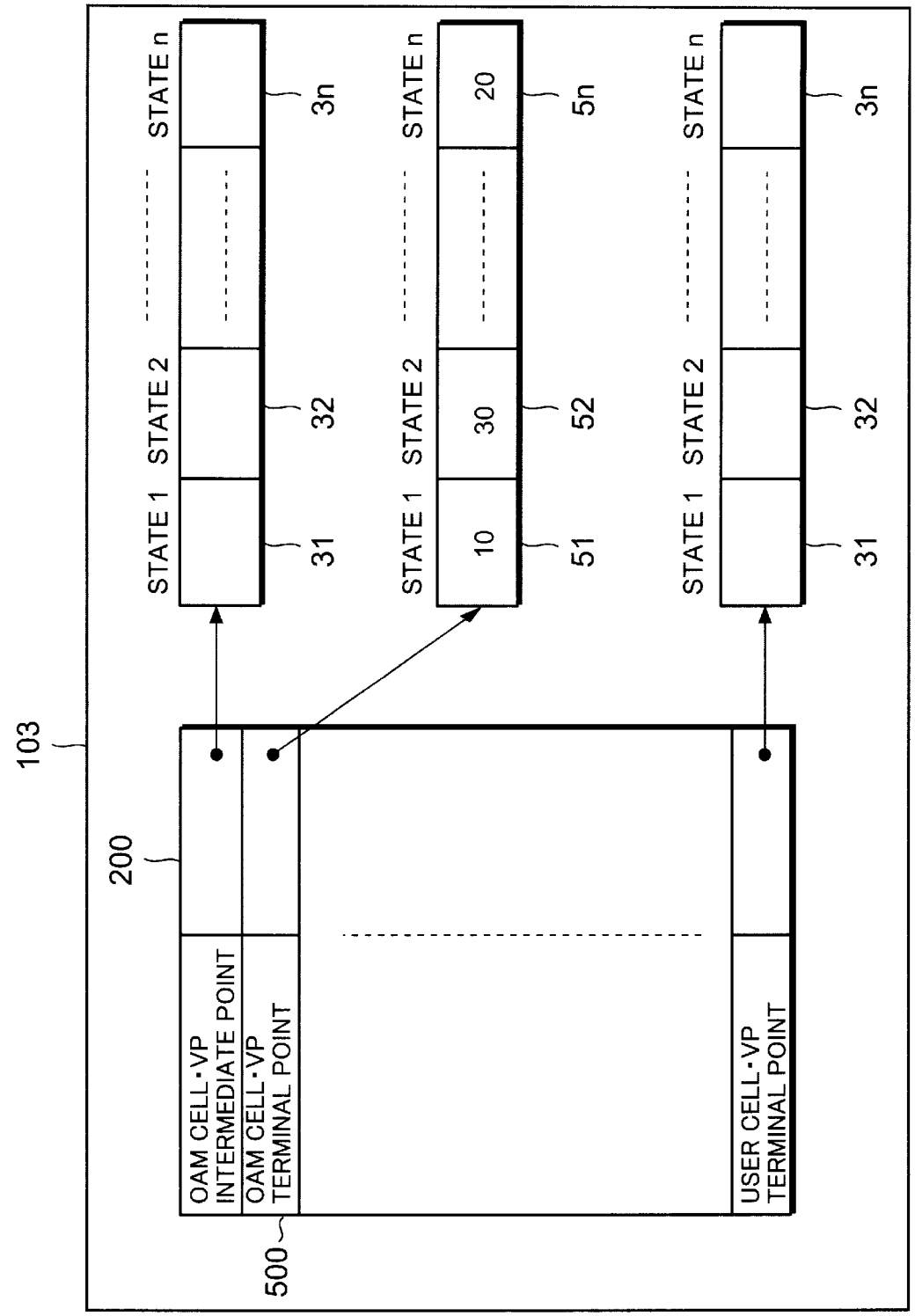
FIG. 5 is a block diagram showing the structure of the memory storing the processing instruction code starting address.

In FIG. 5, a case that processing is different depending upon a condition such as a cell type, a terminal point of a virtual path (VP) and an intermediate point is shown.

The processing instruction code starting address storing memory 103 stores the information of a cell type, a VP terminal point and an intermediate point, the processing instruction code starting addresses 31 to 3n corresponding to the information, an OAM cell and processing instruction code starting addresses 51 to 5n corresponding to the condition of the VP terminal point.

Figure 6:
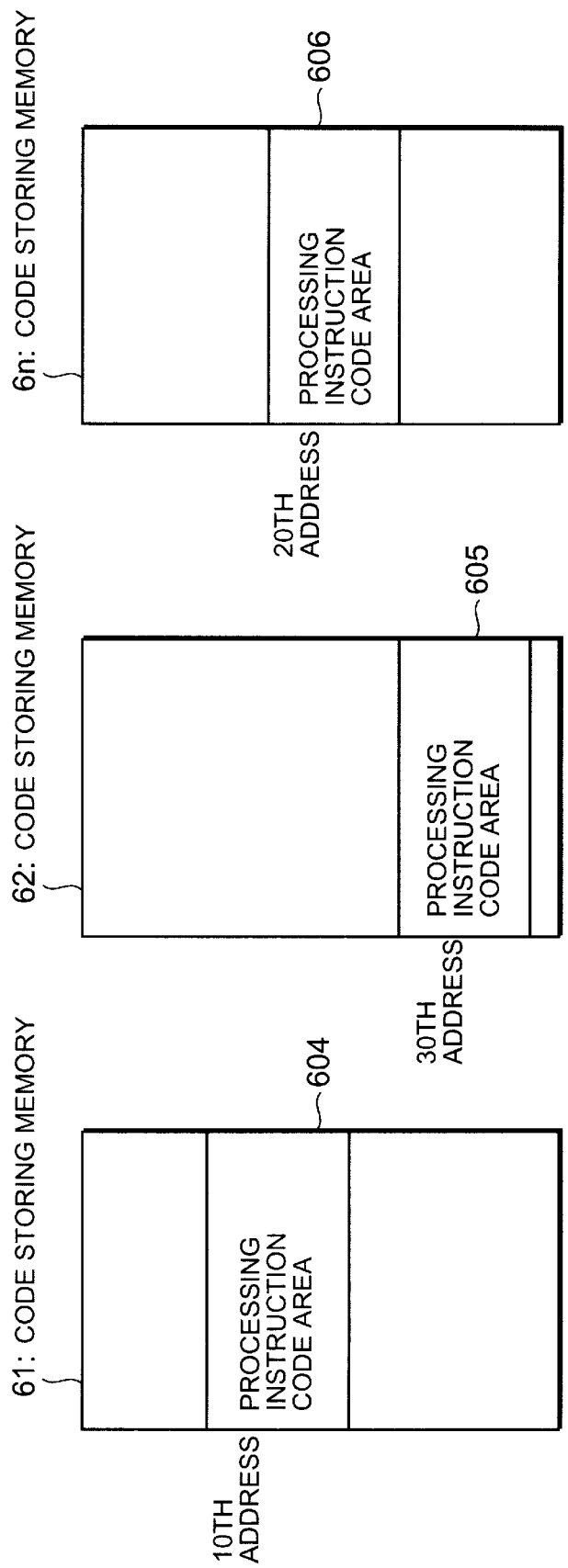
FIG. 6 shows an example of the contents of each memory storing code information provided to the processors 11, 12 and 1n.

As shown in FIG. 6, processing instruction code storing memories 61 to 6n (similar to 304 in FIG. 3) respectively corresponding to the processors 11 to 1n store a processing instruction code when a virtual path identifier (VPI) is 2 at a predetermined address.

Figure 7:
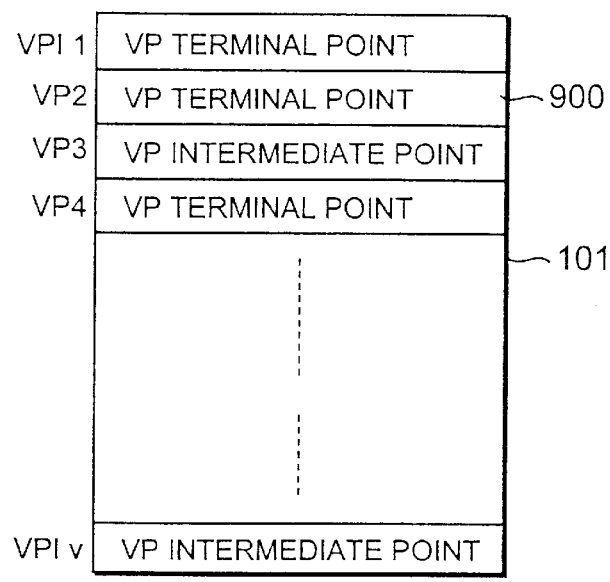
FIG. 7 is a table showing an example of the contents of the memory storing information.
Figure 8:
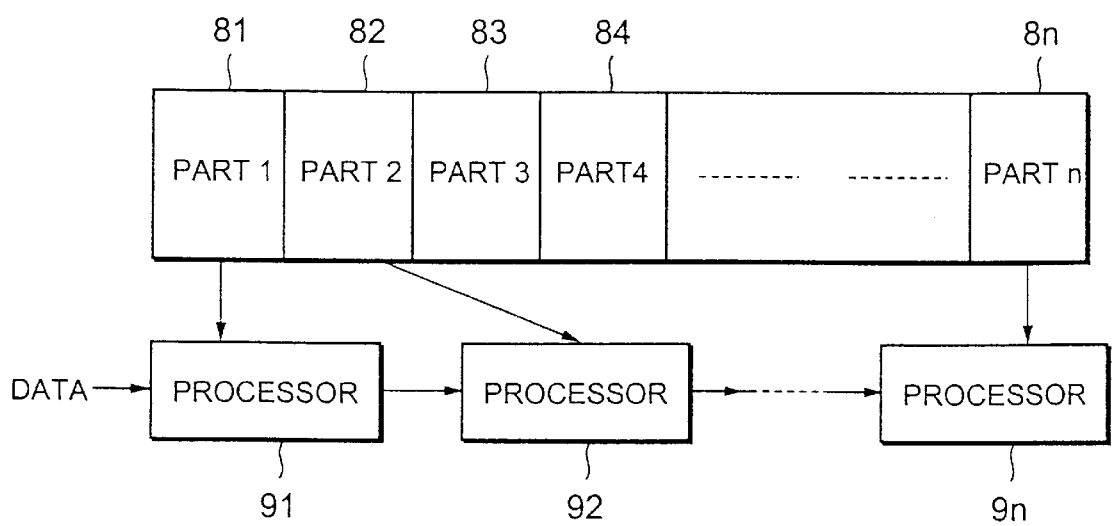
FIG. 8 shows a conventional type ATM cell pipeline processing system.

As shown in FIG. 7, the information of a VP terminal point or an intermediate point corresponding to a value of VPI is stored in the information storing memory 101.

When an operation administration and maintenance (OAM) cell when a virtual path identifier VPI is 2 is received, it is stored in the buffer memory 20. The cell determining section 108 reads required information from the cell, determines the type of the cell and detects that the cell is an OAM cell. The cell determining section also reads a value (=2) of VPI from a predetermined location in the cell.

As shown in FIG. 7, the cell determining section 108 generates an address based upon the value of VPI of 2 and reads information 900 showing a VP terminal point from the information storing memory 101. The information of the above OAM cell and the VP terminal point is informed by the retrieving section 102. The retrieving section 102 retrieves the memory for retrieval 200 using the OAM cell and the VP terminal point as a retrieval key.

As shown in FIG. 5, as the VP terminal point of the OAM cell is stored in a condition storing area 500 of the memory for retrieval 200, the retrieving section 102 reads the processing instruction code starting addresses 51 to 5n (respectively 10, 30, 20) corresponding to the above information and writes the addresses to the address storing memory 300 of each processor 11 to 1n. When predetermined time, for example one cell time elapses, the buffer storing the cell proceeds to the state 1.

The processing instruction code reading control section 301 of the processor 11 reads 10 which is a processing instruction code starting address from the address storing memory 300 and sequentially reads processing instruction codes from the leading address of a processing instruction code area 604 starting from the tenth address of the processing instruction code storing memory 61 shown in FIG. 6. The read processing instruction code is decoded by the instruction decoding section 302, is passed to the processor core 303 and is executed.

When predetermined time, for example one cell time elapses, control proceeds from the buffer memory 21 to the buffer memory 22 for the state 2. When the state transition control section 105 detects the transition of a state, it informs the processing instruction code reading control section 301 in the processor 12 of the transition. The informed processing instruction code reading control section 301 reads 30 which is a processing instruction code starting address from the address storing memory and sequentially reads processing instruction codes from the leading address of a processing instruction code area 605 starting from the thirtieth address of a processing instruction code storing memory 62. The subsequent processing is the same as in the case of the state 1. When control proceeds to a buffer memory for the state n, processing instruction codes are sequentially read from the leading address of a processing instruction code area 606 starting from the twentieth address of the processing instruction code storing memory 6n.

When pipeline processing composed of n pieces of steps is finished, a cell stored in the buffer memory 2n is output from the output port 104.

The embodiment of the present invention is described above, however, the present invention is not limited to this and an address transferring section 400 may be also further provided to the cell processing section 401.

Figure 4:
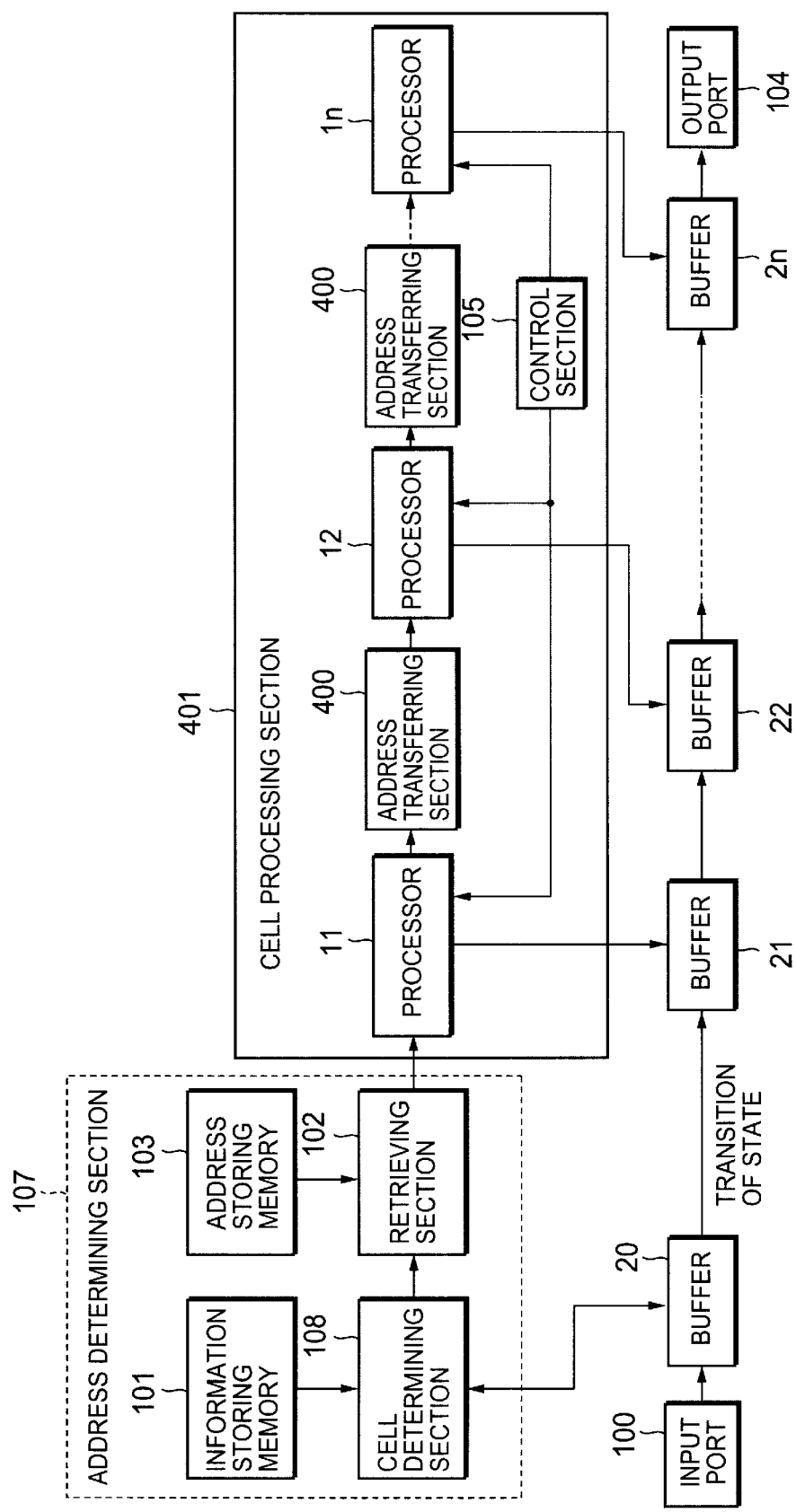
FIG. 4 is a block diagram showing the Pipeline type processor for asynchronous transfer mode (ATM) cells according to the present invention provided with an address transferring section.

As shown in FIG. 4, the address transferring section 400 is means for transferring an address pointing the leading address for reading a processing instruction code from the processing instruction code storing memory 304 in the processor 12 in case processing by the next processor 12 is different from the result of the processing by the processor 11.

That is, as the operation until a cell is received from the input port 100 and the processor 11 executes the processing of the buffer memory 21 for the state 1 and the operation until processing in the state n is finished and is output from the output port 104 are the same as in the embodiment shown in FIG. 1, the description is omitted. If the processing of the next processor 12 is fixed by the result of the processing by the processor 11, the operation is the same as the operation in the embodiment shown in FIG. 1. If the processing of the processor 12 is different from the result of the processing by the processor 11, the processor core 303 informs the address transferring section 400 of a processing instruction code starting address. The address transferring section 400 stores the processing instruction code starting address in an area which the processing instruction code reading control section 301 reads when a state next proceeds in the address storing memory 300 in the processor 12. The operation of the processor 12 is the same as the operation of the processor 11 in this embodiment. A series of processing to an input cell is finished by executing such processing in n pieces of processors 11 to 1n.

Hereby, as this embodiment is provided with a mechanism for transferring a processing instruction code starting address between the processors, the subsequent processing can be varied according to the result of processing on the way of pipeline processing.

According to the present invention described above, in pipeline processing composed of n pieces of steps in which processing is finished within predetermined time, for example within one cell time, if the processing of an input cell is different depending upon a condition such as the type and the contents of the cell, the condition is not required to be determined in processing by each processor by providing a mechanism for determining an address from which a processing instruction code for each processor is read based upon the condition before pipeline processing. As a result, the redundancy of processing is removed, the quantity of processing which each processor can execute within fixed time is increased and efficient processing is enabled.

Particularly, as one cell time is reduced in case a cell is input at high speed and processing instructions executed in one processing are reduced, the present invention is more effective.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A pipeline type processor for asynchronous transfer mode (ATM) cells comprising:

input buffers for storing n pieces of asynchronous transmission mode (ATM) cells;

n pairs of a processor and a buffer for pipeline processing said each cell, the processors provided in a first pipeline arrangement and the buffers provided in a second pipeline arrangement;

an address determining section for determining a pipeline processing condition, said address determining section determining a processing instruction code starting address of said each cell based upon the information of said cell stored in said input buffer; and an n−1 address transferring sections respectively provided between adjacent ones of said processors in the first pipeline arrangement, each of said address transferring sections transferring said processing instruction code starting address between one of the adjacent ones of said processors on an incoming side of the first pipeline arrangement to an other of the adjacent ones of said processors on an outgoing side of the pipeline arrangement;

wherein said processors sequentially execute pipeline processing based upon said processing instruction code starting address, and wherein the first pipeline arrangement is separate from the second pipeline arrangement, and wherein said each cell is passed along the second pipeline arrangement of said buffers for execution by said respective processors at a different one of a plurality of states.

2. A pipeline type processor for asynchronous transfer mode (ATM) cells according to claim 1, wherein each of said address determining sections includes:

an information storing memory for storing information required for retrieval;

an address storing memory for storing an address at which a processing instruction code executed by said processor is stored;

a cell determining section for generating a retrieval condition based upon the contents of said information storing memory and said input buffer; and a retrieving section for informing said processor of a processing instruction code starting address according to a retrieval condition generated by said cell determining section.

3. A pipeline type processor for asynchronous transfer mode (ATM) cells according to claim 1, wherein a time in which said each processor processes said each cell stored in said buffer is equal, the upper limit of said time being one cell time of said ATM cell.

4. A pipeline type processor for asynchronous transfer mode (ATM) cells according to claim 1, wherein said information includes at least one of a cell type a virtual path identifier (VPI) and virtual channel identifier (VCI).

5. A pipeline type processor for asynchronous transfer mode (ATM) cells according to claim 1, wherein said address determining section determines a storing address for an instruction code according to data format.

6. A pipeline type processor for asynchronous transfer mode (ATM) cells according to claim 1, wherein said pipeline processing condition is not determined by any of said processors but instead is provided as a respective processing instruction code starting address for each said processor.

7. A pipeline type processor for asynchronous transfer mode (ATM) cells provided with a plurality of processors each executing a partial process dedicated to each processor for an ATM cell being stored into a buffer corresponding to each processor, said pipeline type processor comprising:

an address storing memory, which stores a plurality of sets of predetermined process starting addresses for each of processors constituting said pipeline type processor, each set of predetermined process starting addresses corresponding to conditions of the ATM cell to be processed in a different respective state;

an address retrieving section, which retrieves a set of predetermined process starting addresses from said address storing memory in accordance with conditions extracted from an input ATM cell, and transfers each predetermined processing starting address to the corresponding processor; and an execution control section, which detects ATM cell arrival at each buffer corresponding to each processor, and instructs the execution of process to the processor when the ATM cell arrives at the corresponding buffer, wherein said processors are disposed in a first pipeline arrangement separate from a second pipeline arrangement in which said buffers are disposed.

8. A pipeline type processor for asynchronous transfer mode (ATM) cells according to claim 7, wherein at least one of said processors includes state transition control sections which read instruction code from memory and decode and execute pipeline processing based upon said starting address.

9. A pipeline type processor for asynchronous transfer mode (ATM) cells according to claim 7, further comprising an address transferring section provided between said processors, said address transferring section transferring said processing instruction code starting address.

10. A pipeline type processor for asynchronous transfer mode (ATM) cells according to claim 7 further comprising:

an input buffer;

an information storing memory for storing information required for retrieval;

a cell determining section for generating a retrieval condition based upon the contents of said information storing memory and said input buffer; and a retrieving section for informing said processor of a processing instruction code starting address according to a retrieval condition generated by said cell determining section, wherein the processing instruction code starting address is respectively different for each of said processors, based on a plurality of states for the retrieval condition that are obtained from the information storing memory in correspondence with a particular condition that matches the retrieval condition.

11. A pipeline type processor for asynchronous transfer mode (ATM) cells according to claim 7, wherein a time in which said each processor processes said each cell stored in said buffer is equal, the upper limit of said time being one cell time of said ATM cell.

12. A pipeline type processor for asynchronous transfer mode (ATM) cells according to claim 7, wherein said information includes at least one of a cell type a virtual path identifier (VPI) and virtual channel identifier (VCI).

* * * * *